(12) United States Patent
McLees (10) Patent No.: US 8,205,471 B2
(45) Date of Patent: Jun. 26, 2012

(54) DEVICE FOR ALLOWING ADDITION AND REPLACEMENT OF JEWELRY STRANDS

(76) Inventor: Nancy R. McLees, Bozeman, MT (US)

( * ) Notice: Subject to any disclaimer, the term of this patent is extended or adjusted under 35 U.S.C. 154(b) by 266 days.

(21) Appl. No.: 12/563,970

(22) Filed: Sep. 21, 2009

(65) Prior Publication Data

US 2011/0067446 A1 Mar. 24, 2011

(51) Int. Cl.
*A44C 5/00* (2006.01)
*F16B 45/06* (2006.01)

(52) U.S. Cl. ........ 63/3.1; 294/82.18; 24/265 H; 24/376; 24/372; 24/598.2

(58) Field of Classification Search ............... 63/3.1, 63/3.2, 7, 10; 24/298, 299, 327, 338, 341, 24/343, 344, 345, 370–373, 376, 459, 460, 24/489, 499, 500, 574.1, 583.1, 265 AL, 24/265 H, 577.1, 598.2, 598.5, 599.2; 294/82.18
See application file for complete search history.

(56) References Cited

U.S. PATENT DOCUMENTS

| | | | |
|---|---|---|---|
| 148,390 A | 3/1874 | Tappan | |
| 292,687 A | 1/1884 | Scott | |
| 312,982 A | 2/1885 | Donald | |
| 384,512 A | 6/1888 | Dillon | |
| 395,663 A | 1/1889 | McCord | |
| 522,906 A | 7/1894 | Lehman | |
| 682,684 A * | 9/1901 | Hakemeyer | 24/598.5 |
| 952,958 A * | 3/1910 | Straughan | 294/82.1 |
| 982,556 A | 1/1911 | White | |
| 1,471,973 A * | 10/1923 | Minder | 24/598.5 |
| 1,502,706 A * | 7/1924 | Aggers | 294/82.18 |
| 1,567,851 A | 12/1925 | Lorber | |
| 1,584,307 A | 5/1926 | King | |
| 1,657,087 A * | 1/1928 | Johnston et al. | 24/598.5 |
| 1,680,551 A * | 8/1928 | King | 24/577.1 |
| 1,686,424 A * | 10/1928 | Thomson et al. | 24/136 R |
| 1,749,096 A * | 3/1930 | Baxter | 24/376 |
| 2,019,691 A | 11/1935 | Morehouse | |
| 2,128,804 A * | 8/1938 | Donaldson | 24/376 |
| 2,319,180 A | 5/1943 | Gore | |
| 2,521,589 A | 9/1950 | Livingston | |
| 3,002,242 A * | 10/1961 | Donaldson | 24/376 |
| 3,079,657 A | 3/1963 | Russell | |
| 3,135,031 A | 6/1964 | Brosse | |
| 3,137,049 A * | 6/1964 | Noble | 24/370 |
| 3,270,494 A * | 9/1966 | Holmes | 59/86 |
| 3,337,256 A * | 8/1967 | Shropshire, Jr. | 294/82.1 |
| 3,599,298 A * | 8/1971 | Anderson | 24/598.5 |
| 3,872,861 A | 3/1975 | Tamny et al. | |
| 4,062,088 A * | 12/1977 | Fredriksson | 24/376 |
| 4,411,050 A * | 10/1983 | Couture | 24/598.5 |
| 4,781,037 A * | 11/1988 | Willibald | 63/13 |
| 5,050,273 A | 9/1991 | Okura | |

(Continued)

*Primary Examiner* — Robert J Sandy
*Assistant Examiner* — Louis Mercado
(74) *Attorney, Agent, or Firm* — Antionette M. Tease (57) ABSTRACT

A device for allowing jewelry strands to be added or replaced with two interlocking arms, two rotating members, two knobs, and a shaft. The closed end of each interlocking arm is attached to a rotating member, the shaft extends through an aperture in each rotating member, and a knob is situated on each end of the shaft. The two interlocking arms are roughly the same size. The interlocking arms are positioned one on top of the other such that they form a closed shape when the interlocking arms are in a closed position. The rotating members rotate about the shaft, thereby causing the interlocking arms to rotate relative to one another.

10 Claims, 5 Drawing Sheets

U.S. PATENT DOCUMENTS

| | | |
|---|---|---|
| 5,497,636 A | 3/1996 | Felcher |
| 5,515,584 A | 5/1996 | Adell |
| 5,669,242 A | 9/1997 | Cayton |
| 6,675,611 B2 | 1/2004 | Hunter |
| 2003/0010057 A1 | 1/2003 | Hunter |
| 2004/0007017 A1* | 1/2004 | Flaherty .......................... 63/3.1 |
| 2004/0194503 A1* | 10/2004 | Schnitman ...................... 63/3.2 |

* cited by examiner

DEVICE FOR ALLOWING ADDITION AND REPLACEMENT OF JEWELRY STRANDS

BACKGROUND OF THE INVENTION

1. Field of the Invention

The present invention relates generally to the field of jewelry, and more specifically, to a device that allows strands of necklaces, bracelets and similar pieces of jewelry to be replaced and multiple strands to be worn at the same time.

2. Description of the Related Art

A typical necklace has a single clasp, each end of which is permanently attached to one or more strands. With this type of necklace, the wearer cannot change strands or wear more than one strand if the necklace has only a single strand. What would be more desirable is a necklace that would allow the wearer not only to replace strands (for example, to change colors or types of jewels) but also to wear more than one strand on the same necklace. This kind of versatility would enable a person to change her ornamental appearance without buying a new piece of jewelry. The same concept that applies to necklaces could apply to bracelets or any other piece of jewelry that comprises at least one strand and a clasp.

Attempts have been made to invent devices that would provide this level of versatility, but none has possessed the structural features of the present invention. For example, U.S. Patent Application Pub. No. 2002/0078707 discloses a piece of jewelry comprising a series of common jewelry fasteners on links. One or more strands may be interchangeably connected to the fasteners. The fasteners may be lobster clasps, S-clasps, or other types of fasteners. The illustrations show a necklace with three fasteners in which the two outer fasteners are used to attach opposite ends of the same strand(s), and the inner fastener is used to adjust the length of the necklace (by connecting the fastener to links in the chain between the inner fastener and one of the two outer fasteners).

U.S. Patent Application Pub. No. 2004/0007107 (Flaherty) provides a necklace with a central clasp and two spring ring clasps. Each spring ring clasp is either permanently attached to one end of the central clasp or permanently attached to a necklace strand. In one embodiment, a spring ring clasp is permanently attached to each end of the central clasp and removably coupled to one or more necklace strands, thereby allowing the necklace strands to be interchanged. In an alternate embodiment, a spring ring clasp is permanently attached to each end of the necklace strand, and the spring ring clasps are then removably coupled (clasped) to each end of the central clasp.

U.S. Pat. No. 3,135,031 (Brosse, 1964) describes a clasp that allows more than one jewelry strand to be worn at the same time and strands to be detached and replaced. The clasp itself is comprised of a substantially rectangular catch member and a substantially rectangular latch member, each of which has an open hook end projecting from one longitudinal edge of the rectangular member. Individual strands with rings on each end are inserted over the hook end of the catch or latch member and slid down onto the longitudinal edge of the member. The strands are prevented from falling off by locking bars that are part of the clasp.

U.S. Pat. No. 6,675,611 (Hunter, 2004) discloses a necklace mount that allows a person to wear more than one necklace at a time. In one embodiment, the mount is shaped like a hoop, the ends of each necklace are coupled to the mount with hook-and-loop-shaped fasteners, and spacers are used to maintain a certain distance between the strands where they attach to the mount to prevent tangling. In an alternate embodiment, the mount is a solid disc with protruding necklace attachment points or fasteners. The mount itself acts as the central clasp.

U.S. Pat. No. 7,350,376 (Couling, 2008) provides a jewelry clasp that supports a plurality of strands. The clasp itself comprises strand retainer bars (one on either side of the clasp) that hold opposite ends of each jewelry strand. Each jewelry strand, however, must comprise an individual fastener on either end of the strand in order to couple with the strand retainer bar.

Unlike the inventions described in the '707 and '107 patent applications, the present invention does not rely strictly on existing clasp designs but instead provides a unique device with interlocking and rotatable arms that is used in addition to (and on either side of) the central clasp to allow strands to be interchanged. The locking mechanism is provided by overlapping and conversely oriented arms that rotate about a common axis.

Unlike the inventions described in the '031, '611 and '376 patents, the present invention is not the clasp itself but a device that is situated on either side of the clasp (in some cases, with chain in between the clasp and the device) and that allows strands to be removed, replaced and/or added to the necklace or other piece of jewelry as desired. Thus, the present invention may be used with any existing type of jewelry clasp acting as the central clasp. In contrast to the Couling design, the present invention does not require the jewelry strands to have individual fasteners on either end.

BRIEF SUMMARY OF THE INVENTION

The present invention is a device for allowing jewelry strands to be added or replaced comprising two interlocking arms, two rotating members, two knobs, and a shaft, wherein each interlocking arm comprises a closed end and an open end, wherein the closed end of each interlocking arm is attached to one of the rotating members, wherein the shaft extends through an aperture in each of the rotating members, wherein the shaft comprises two ends, and a knob is situated on each end of the shaft, with the rotating members in between the knobs, to prevent the rotating members from falling off the shaft, wherein each interlocking arm is of a certain size, and the two interlocking arms are roughly the same size, wherein each interlocking arm extends downward and outward from the rotating member to which it is attached, curves inward for a certain distance, extends upward and inward toward the rotating member to which it is not attached, and terminates short of the rotating member to which it is not attached, wherein the interlocking arms are positioned one on top of the other such that they form a closed shape when the interlocking arms are in a closed position, and wherein the rotating members rotate about the shaft, thereby causing the interlocking arms to rotate relative to one another. The open end of each interlocking arm is enlarged relative to a thickness of a middle portion of the interlocking arm between the closed end and the open end. In a preferred embodiment, each of the two interlocking arms is free to rotate 360 degrees.

In an alternate embodiment, the present invention is a device for allowing jewelry strands to be added or replaced comprising two interlocking arms, two rotating members, two knobs, and a shaft, wherein each interlocking arm comprises a closed end and an open end, wherein the closed end of each interlocking arm is attached to one of the rotating members, wherein the shaft extends through an aperture in each of the rotating members, wherein the shaft comprises two ends, and a knob is situated on each end of the shaft, with the rotating members in between the knobs, to prevent the rotating members from falling off the shaft, wherein each interlocking arm is of a certain size, and the two interlocking arms are roughly the same size, wherein each interlocking arm extends inward and downward from the rotating member to which it is attached until it has extended beyond the rotating member to which it is not attached, curves inward for a certain distance, extends upward and inward toward the rotating member to which it is attached, and terminates short of the rotating member to which it is attached, wherein the interlocking arms are positioned one on top of the other such that they form a closed shape when the interlocking arms are in a closed position, and wherein the rotating members rotate about the shaft, thereby causing the interlocking arms to rotate relative to one another. In a preferred embodiment, each of the two interlocking arms is free to rotate at least 180 degrees.

In one embodiment, the present invention further comprising a barrel piece that is situated on the shaft and between the two rotating members. Preferably, the barrel piece has two ends and a shaft extends from each end of the barrel piece, the barrel piece and the shafts are a single piece. The barrel piece is preferably attached to one part of a jewelry clasp or to a ring that is attached to a link in a jewelry chain.

In a preferred embodiment, the closed shaped formed by the interlocking arms when they are in a closed position is selected from the group consisting of: a circle, an oval, a square, a rectangle, a triangle, a hexagon, an octagon, and a diamond.

In one embodiment, in lieu of the knobs, the device comprises an inverted U-shaped member with two ends and a top surface, the shaft extends through each end of the inverted U-shaped member, the rotating members are situated in between the ends of the inverted U-shaped member, thereby preventing the rotating members from falling off the shaft, and the top surface of the inverted U-shaped member is attached to one part of a jewelry clasp or to a ring that is attached to a link in a jewelry chain.

In yet another embodiment, the present invention further comprising an arc-shaped member with two ends, wherein each end of the arc-shaped member is attached to one of the knobs on either end of the shaft, and wherein the arc-shaped member either forms one part of a jewelry clasp or is attached to a link in a jewelry chain.

In a preferred embodiment, at least one jewelry strand is placed on the interlocking arms when they are in a closed position, each jewelry strands comprises two ends and a ring on each end of the strand, and the ring on each end of the strand is placed around both of the interlocking arms when they are in a closed position by inserting the ring over the open end of one of the interlocking arms, sliding the ring across the interlocking arm toward the closed end of the interlocking arm, and inserting the ring over the open end of the other interlocking arm.

REFERENCE NUMBERS

1 Device (present invention)
2 Arm
3 Open end (of arm)
4 Closed end (of arm)
5 Rotating member
6 Barrel piece
7 Hook-and-eye clasp
8 Toggle clasp
9 Lobster clasp
10 Knob
11 Inverted U-shaped member
12 Ring
13 Link
14 Chain
15 Top surface (of inverted U-shaped member)
16 Arc-shaped member
17 Shaft

DETAILED DESCRIPTION OF INVENTION

Figure 1:
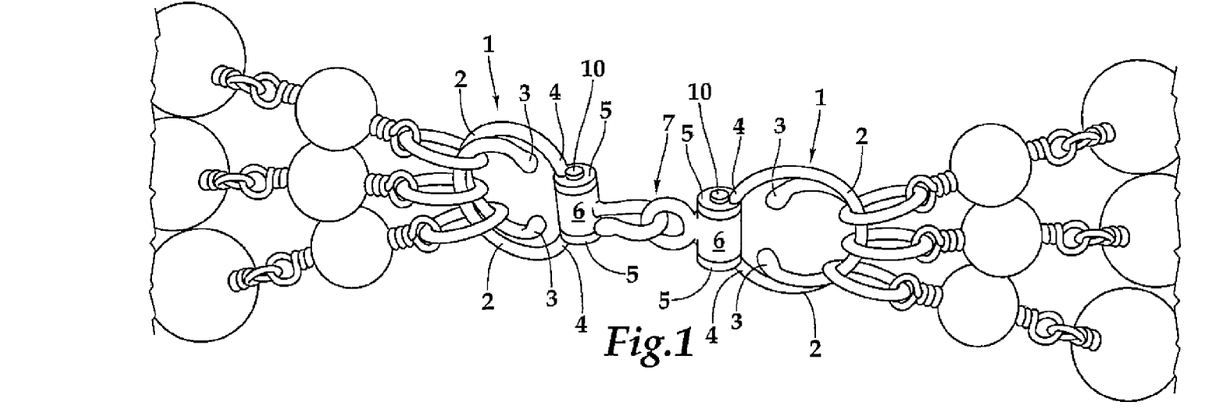
FIG. 1 is a perspective view of a first embodiment of the present invention shown with a hook-and-eye clasp and with a plurality of strands coupled to the interlocking arms of the present invention.

FIG. 1 is a perspective view of a first embodiment of the present invention shown with a hook-and-eye clasp and with a plurality of strands coupled to the interlocking arms of the present invention. As shown in this figure, the present invention is a device 1 comprising two overlapping and conversely oriented arms 2. Each arm 2 comprises an open end 3 and a closed end 4. The closed end 4 of each arm is permanently attached to a rotating member 5 that rotates about a shaft 17 (see FIGS. 21 and 22). The rotating member 5 is not confined to any particular shape or size as long as it rotates about the shaft 17 and is permanently attached to the closed end 4 of one of the arms 2.

The rotating member 5 may take a variety of decorative shapes and sizes, one example of which is shown in FIG. 1. Examples of alternate designs are shown in FIGS. 14-19. The present invention is not limited to any particular shape or size of the rotating member 5 as long as it serves the intended purpose of allowing the arms 2 to rotate about the shaft 17.

Figure 2:
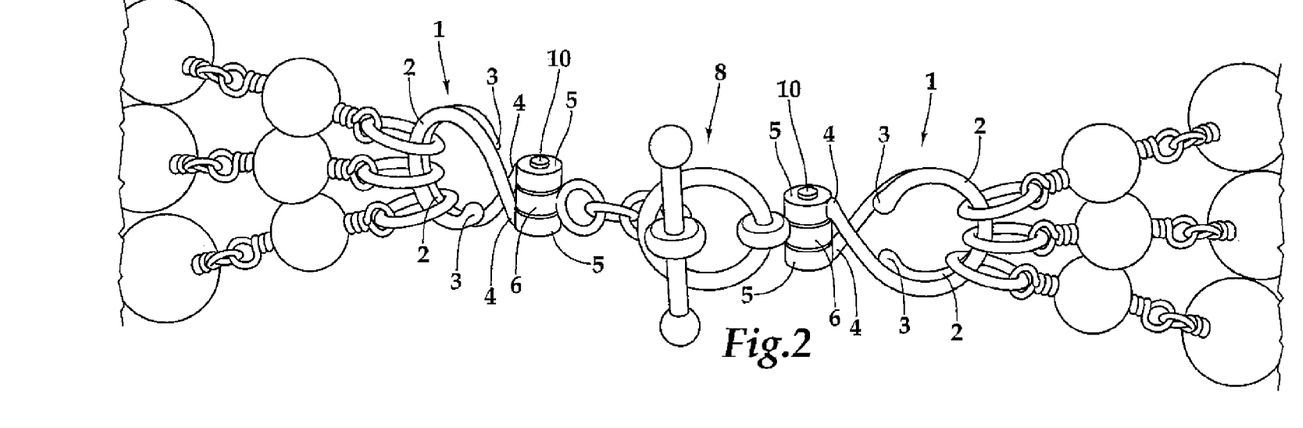
FIG. 2 is a perspective view of a second embodiment of the present invention shown with a toggle clasp and with a plurality of strands coupled to the interlocking arms of the present invention.
Figure 3:
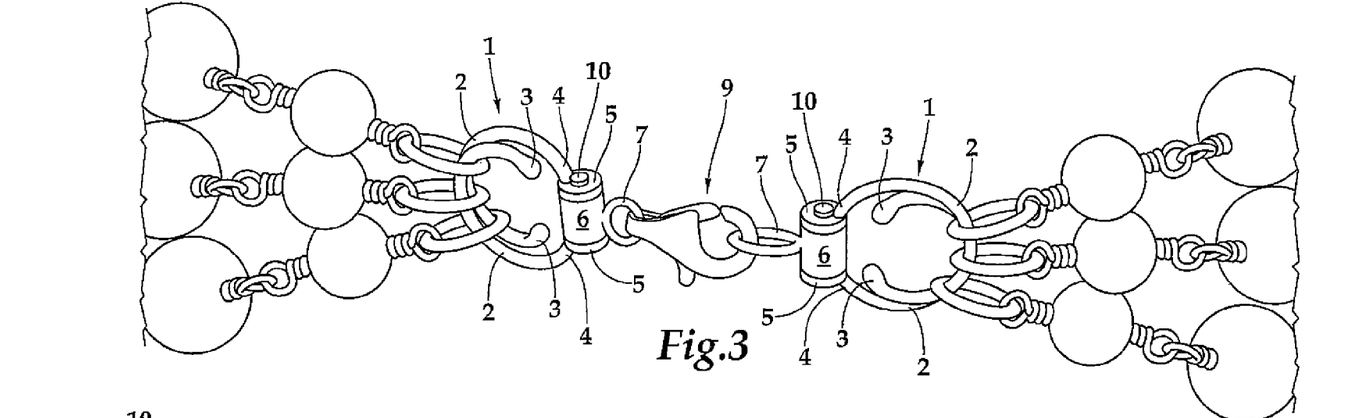
FIG. 3 is a perspective view of a second embodiment of the present invention shown with a lobster clasp and with a plurality of strands coupled to the interlocking arms of the present invention.

In the embodiment shown in FIG. 1, the two rotating members 5 are located on either side of a barrel piece 6 to which is attached one end of a hook-and-eye clasp 7. The clasp 7 joins the two devices 1 together; however, the present invention is not limited to any particular type of clasp. FIG. 2 shows a toggle clasp 8, and FIG. 3 shows a lobster clasp 9. Other types of clasps—such as a spring ring clasp (not shown), an S-clasp (not shown) and any other type of clasp—may also be used. The present invention is not limited to the configuration shown in FIG. 1; that is, the barrel piece 6 may take a different form (see FIG. 14), or it may be omitted altogether (see FIGS. 16 and 18).

There must, however, be a means of holding the rotating members 5 on the shaft 17. In FIG. 1, small knobs 10 on the outside of both rotating members 5 are fixedly attached to the shaft 17 and prevent the rotating members 5 from coming off the shaft. The embodiment shown in FIG. 14 has similar knobs 10. The embodiment shown in FIG. 16 has an inverted U-shaped member 11, the ends of which are attached to the ends of the shaft 17 to hold the rotating members 5 on the shaft 17. The embodiment shown in FIG. 18 has knobs 10 similar to those shown in FIGS. 1 and 14. The present invention is not limited to any particular method of holding the rotating arms 5 on the shaft 17 as long as there is some mechanism for preventing them from falling off the ends of the shaft 17 while still allowing them to rotate.

Figure 20:
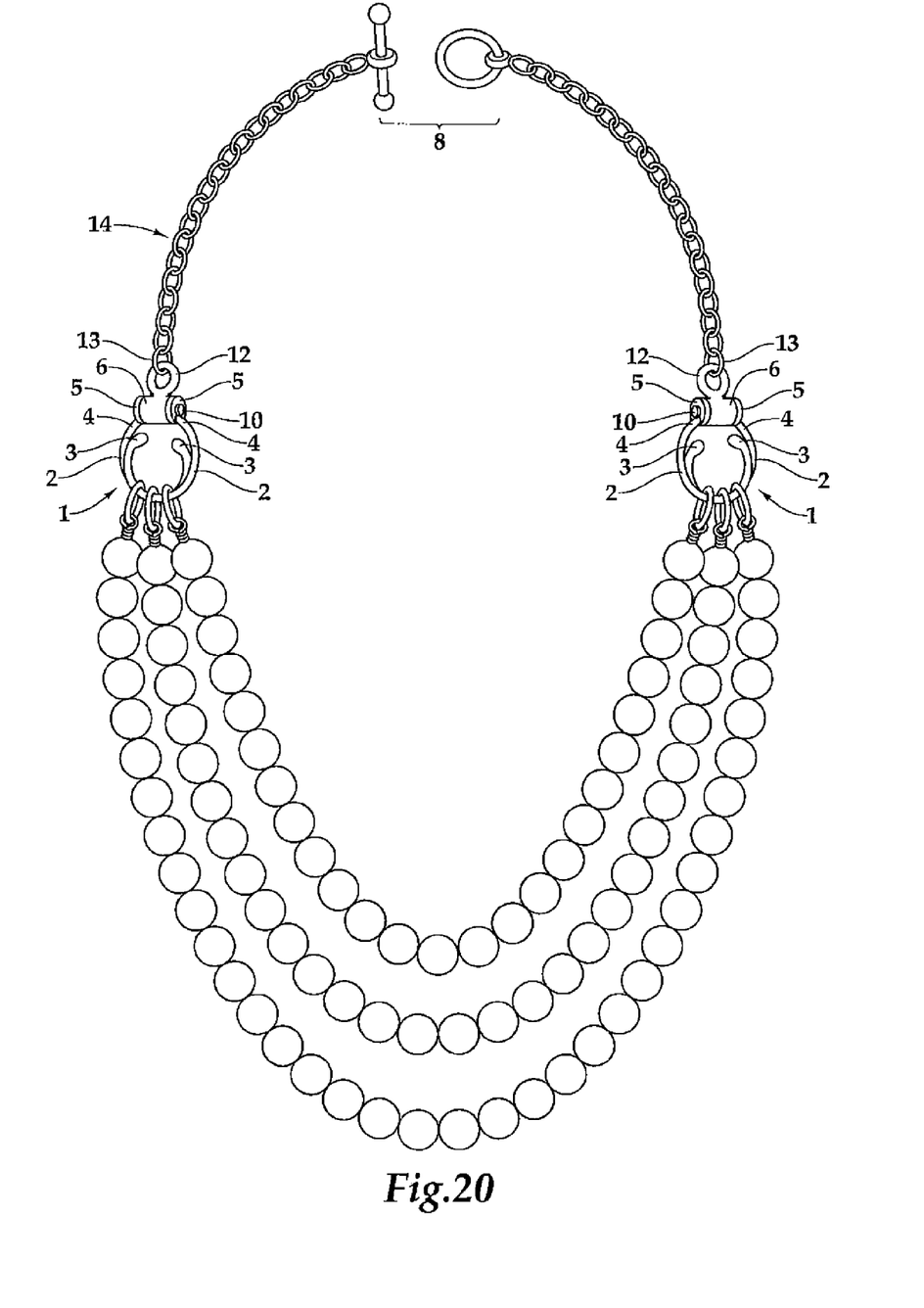
FIG. 20 is a perspective view of the first embodiment of the present invention in which there are a plurality of links between the present invention and the central clasp.

There must also be a means of attaching the device 1 to either one of two separating parts of the clasp 7, 8, 9 (see FIGS. 1, 2 and 3, respectively) or to a ring 12 for attaching the device 1 to a link 13 in a chain 14 (see FIG. 20). In the embodiment shown in FIG. 1, one part of the hook-and-eye clasp 7 is fixedly attached to the barrel piece 6 of each device 1. In the embodiment shown in FIG. 14, one part of the clasp (shown here as a ring 12) is fixedly attached to the barrel piece 6 of the device. In the embodiment shown in FIG. 16, one part of the clasp (shown here as a ring 12) is fixedly attached to the top surface 15 of the inverted U-shaped member 11. In the embodiment shown in FIG. 18, an arc-shaped member 16 extends from one of the two knobs 10 on the outside of the rotating members 5 to the other knob 10 on the outside of the other rotating member 5 to form one part of the clasp. As shown in these figures, the present invention is not limited to any particular method of attaching the device to a clasp part or ring.

In the embodiments shown in FIGS. 1, 2 and 3, a single device 1 is situated on either side of the clasp 7, 8, 9, and the clasp is comprised of two separating parts. One of the two separating parts of the clasp is fixedly attached to each of the two devices 1, as shown; however, the present invention may also be attached to links 13 in a chain 14, as shown in FIG. 20. In this figure, the device 1 is attached to a ring 12 rather than to a separating part of a clasp, the ring 12 extends through one of the links 13 in the chain 14, and the chain 14 separates each device 1 from the clasp 8.

FIG. 2 is a perspective view of a second embodiment of the present invention shown with a toggle clasp and with a plurality of strands coupled to the interlocking arms of the present invention. The difference between this second embodiment and the first embodiment (shown in FIG. 1) is that in the first embodiment, the closed ends 4 of the arms 2 do not overlap one another. In the embodiment shown in FIG. 2, however, the closed ends 4 cross over one another before attaching to the rotating members 5.

FIG. 3 is a perspective view of a second embodiment of the present invention shown with a lobster clasp and with a plurality of strands coupled to the interlocking arms of the present invention. This figure is the same as FIG. 1 except that the devices 1 are shown with a lobster clasp 9 between them.

Figure 4:
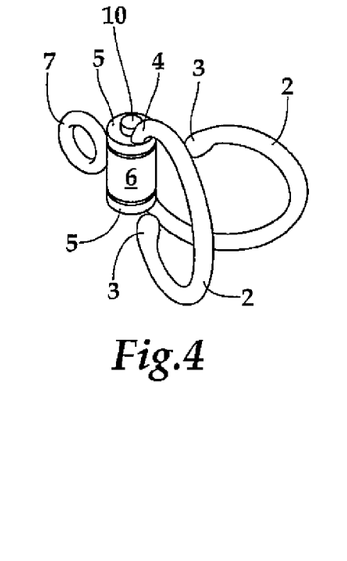
FIG. 4 is a perspective view of the first embodiment shown with the arms apart.

FIG. 4 is a perspective view of the first embodiment shown with the arms apart. As shown in this figure, the arms 2 are roughly the same size. Each arm 2 comprises an open end 3 and a closed end 4. In this embodiment, the closed end 4 of each arm 2 is fixedly attached to the rotating member 5 on either side of the barrel piece 6. Thus, the arm 2 and rotating member 5 form a single part (see FIG. 21). The barrel piece 6 and shaft 17 also form a single part (see FIG. 21). The knobs 10 may be formed or attached in a number of different ways. One method is to solder the knobs 10 to the ends of the shaft 17. Another method is to hammer the ends of the knob 10 after the rotating member 5 is placed on the shaft 17, thereby flaring the shaft at the ends and creating a rivet. The present invention is not limited to any particular method of creating or forming the knobs 10, nor is the present invention limited to any particular shape or design of the knobs as long as they serve the function of holding the rotating members 5 on the shaft 17. In this embodiment, each arm 2 is free to rotate three hundred sixty degrees (360°) about the shaft.

Figure 5:
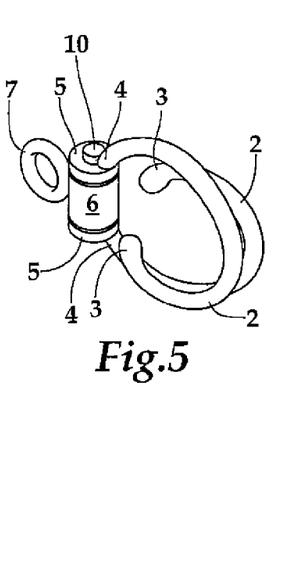
FIG. 5 is a perspective view of the first embodiment shown with the arms together.
Figure 6:
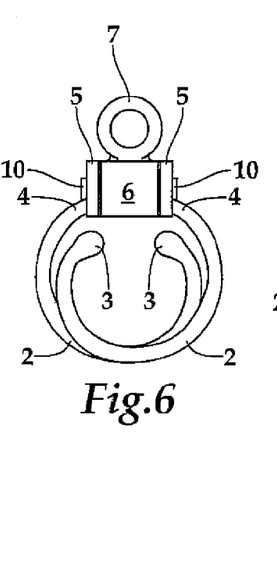
FIG. 6 is a front view of the first embodiment shown with the arms together.

When the device is in a closed position (see FIGS. 5 and 6), one arm 2 lies directly on top of the other. Each arm 2 extends downward and outward from the rotating member 5 to which its closed end 4 is attached, curves inward and outward, and then extends upward toward the opposite rotating member 5, terminating in close proximity to but short of the opposite rotating member 5. In this embodiment, the arms are situated such that they form a full circle when they are in a closed position (see FIGS. 5 and 6).

To place a strand on the device, the interlocking arms 2 are rotated apart, and one end of the strand (in the form of a ring) is placed around the open end 3 of one of the arms. The strand is then slid to the other side of the arm, the arms are closed, and the strand is placed around the open end 3 of the other arm 2 such that the ring on the end of the strand now encircles both arms. With the arms closed and the ring around both arms, the ring on the end of the strand is prevented from falling off the device. Furthermore, in this position (with the ring on the end of the strand around both arms), the arms cannot rotate into an open position but are maintained in a closed (or locked) position by the ring. This is shown in FIGS. 1 and 2. More than one strand may be placed on the device in this manner.

Figure 7:
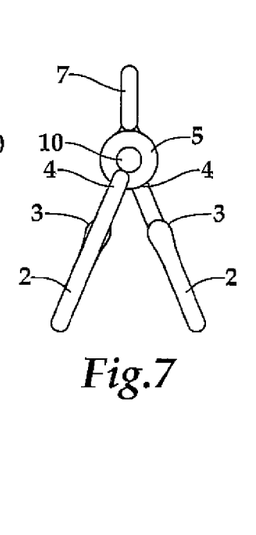
FIG. 7 is a side view of the first embodiment shown with the arms apart.
Figure 8:
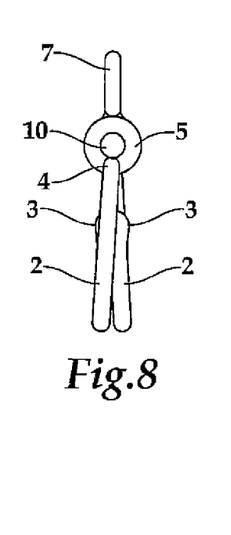
FIG. 8 is a side view of the first embodiment shown with the arms together.

To remove a strand or strands from the device, the ring on the end of the strand is first moved toward one of the rotating members 5 and slid over the open end 3 of one of the arms 2, and then it (or they, if multiple strands) is/are slid around the other arm 2 (toward the opposite rotating member 5) and over the open end 3 of that arm 2. FIGS. 7 and 8 are side views, respectively, of the first embodiment shown with the arms apart and with the arms together. To remove multiple strands, all of the strands must be moved at the same time (they cannot be removed one at a time).

Figure 9:
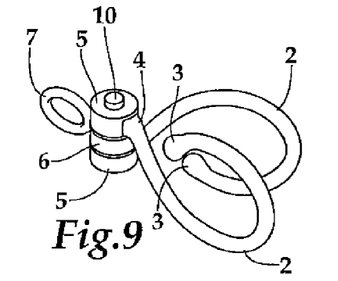
FIG. 9 is a perspective view of the second embodiment shown with the arms apart.
Figure 10:
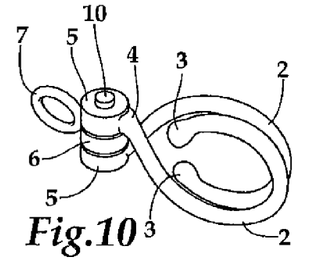
FIG. 10 is a perspective view of the second embodiment shown with the arms together.
Figure 11:
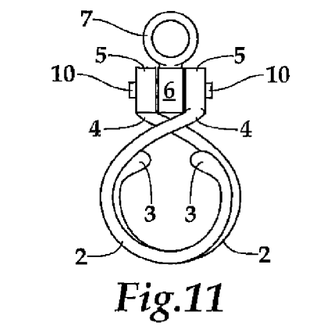
FIG. 11 is a front view of the second embodiment shown with the arms together.
Figure 12:
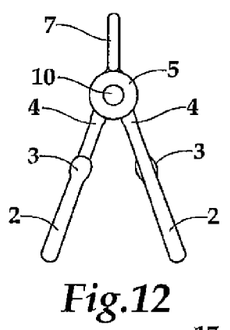
FIG. 12 is a side view of the second embodiment shown with the arms apart.
Figure 13:
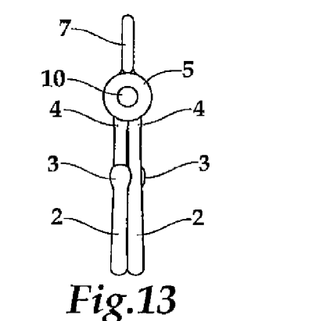
FIG. 13 is a side view of the second embodiment shown with the arms together.

FIGS. 9 and 10 are perspective views, respectively, of the second embodiment shown with the arms apart and with the arms together. FIG. 11 is a front view of the second embodiment shown with the arms together, and FIGS. 12 and 13 are side views, respectively, of the second embodiment shown with the arms apart and with the arms together. This embodiment is the same as the first embodiment except that the closed ends 4 of the arms 2 cross one another underneath the barrel piece 6 and just prior to attaching to the rotating members 5, as shown in the figures. With this particular embodiment, the arms 2 cannot rotate three hundred sixty degrees (360°) because the closed ends 4 of the arms 2 hit the clasp piece 7 at roughly one hundred twenty degrees (120°). The method of adding and removing a strand, however, is the same as described above for the first embodiment.

FIGS. 14-19 illustrate a number of variations on the first and second embodiments. As shown in these figures, the rotating members 5 may be adjacent to one another or separated by a barrel piece, and the arms 2 when closed may form a circle or a triangle (they could also form an oval, a rectangle, a diamond, a hexagon or any other closed shape). Note that the shaft 17 about which the rotating members 5 rotate is visible in FIGS. 15, 17 and 19.

Figure 14:
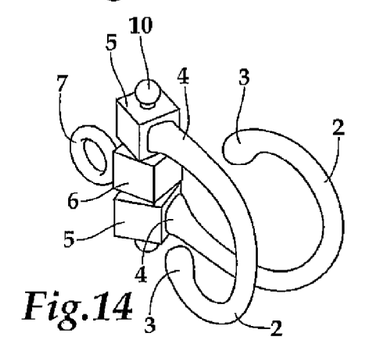
FIG. 14 is a perspective view of the first embodiment shown with the arms apart and with an alternate barrel design.
Figure 15:
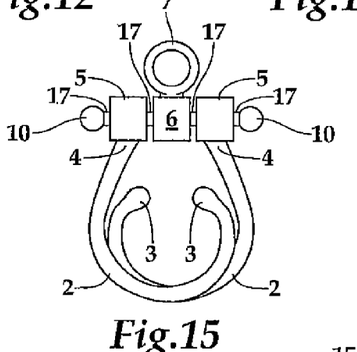
FIG. 15 is a front view of the embodiment shown in FIG. 14 with the arms together.

FIG. 14 is a perspective view of the first embodiment shown with the arms apart and with an alternate barrel design. In this embodiment, the barrel piece 6 is in the shape of a square, as are the rotating members 5. FIG. 15 is a front view of this same embodiment shown with the arms together.

Figure 16:
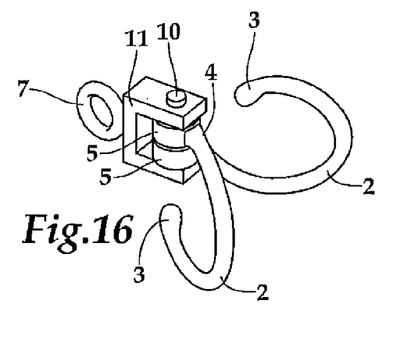
FIG. 16 is a perspective view of the first embodiment shown with the arms apart and with an inverted U-shaped member in lieu of the barrel piece.
Figure 17:
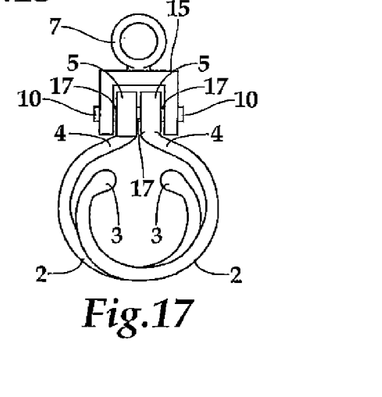
FIG. 17 is a front view of the embodiment shown in FIG. 16 with the arms together.

FIG. 16 is a perspective view of the first embodiment shown with the arms apart and with an inverted U-shaped member in lieu of the barrel piece. In this embodiment, there is no barrel piece; instead, the two rotating members 5 are adjacent to one another, and an inverted U-shaped member 11 extends from one side of one rotating member up and over both rotating members and down to the other side of the other rotating member. The top surface 15 of the inverted U-shaped member 11 is attached to one part of the clasp 7. FIG. 17 is a front view of this same embodiment shown with the arms together.

Figure 18:
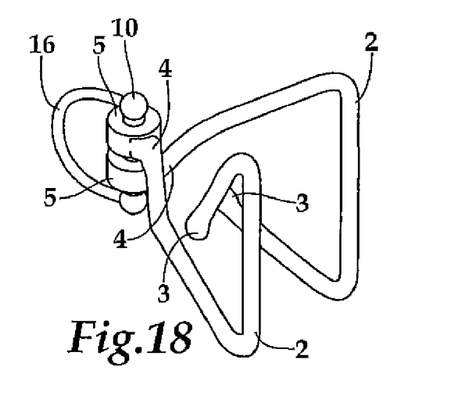
FIG. 18 is a perspective view of the second embodiment shown with the arms together, with an alternate barrel design, and with an alternate shape to the interlocking arms.
Figure 19:
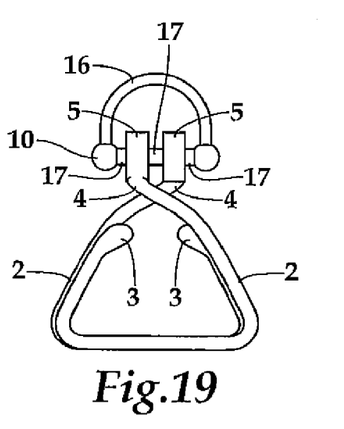
FIG. 19 is a front view of the second embodiment shown with the arms together, with an alternate barrel design, and with an alternate shape to the interlocking arms.

FIG. 18 is a perspective view of the second embodiment shown with the arms apart and with an arc-shaped member in lieu of the barrel piece. In this embodiment, as in the embodiment shown in FIG. 16, there is no barrel piece; instead, the two rotating members 5 are adjacent to one another, and an arc-shaped member 16 extends from the knob 10 on the outside of one of the rotating members up and over both rotating members and down to the knob 10 on the outside of the other rotating member. In this embodiment, the arc-shaped member 16 itself forms part of the clasp. The other difference between this embodiment and previous embodiments is that the each arm 2 is shaped like a partial triangle (with three sides but an incomplete third side) such that when the arms are closed, they form a complete triangle from the front view (see FIG. 19). The present invention is not limited to any particular shape of the arms as long as they form a closed shape when they are in a closed position. As used herein, the term "closed position" means that the arms are together. FIG. 19 is a front view of this same embodiment shown with the arms together.

FIG. 20 is a perspective view of the first embodiment of the present invention (the same embodiment shown in FIG. 1) in which there are a plurality of links between the present invention and the central clasp. As explained above, in this embodiment, rather than the device 1 being attached directly to a separating part of a clasp, each device 1 is attached to a ring 12 that is in turn coupled to a link 13 in a chain 14 that extends from the device 1 to a separating part of a clasp (shown as a toggle clasp 8 in FIG. 20).

Figure 21:
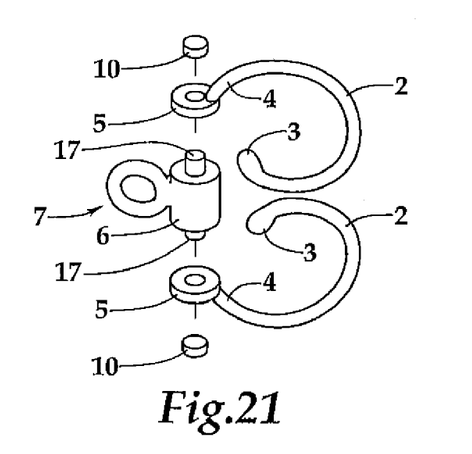
FIG. 21 is an exploded view of the first embodiment of the present invention.
Figure 22:
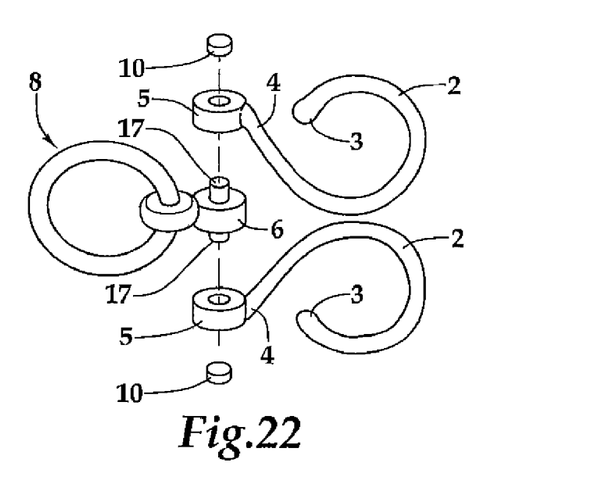
FIG. 22 is an exploded view of the second embodiment of the present invention.

FIGS. 21 and 22 are exploded views, respectively, of the first and second embodiments. Although the knobs 10 are shown as separate pieces in these figures, they may also be hammered ends of the shaft itself, as described above.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A device for allowing jewelry strands to be added or replaced comprising:
    (a) two interlocking arms;
    (b) two rotating members;
    (c) a barrel piece with two ends;
    (d) a shaft extending from each end of the barrel piece and comprising two ends; and
    (e) two knobs that are soldered to each end of the shaft:
    wherein each interlocking arm comprises a closed end and an open end;
    wherein the closed end of each interlocking arm is attached to one of the rotating members;
    wherein each shaft extends through a respective aperture of each rotating members;
    wherein the rotating members are in between the knobs, to prevent the rotating members from falling off the shaft;
    wherein each interlocking arm is of a certain size, and the two interlocking arms are roughly the same size;
    wherein the open end of each interlocking arm is enlarged relative to a thickness of a middle portion of the interlocking arm between the closed end and the open end:
    wherein each interlocking arm extends downward and outward from the rotating member to which it is attached, curves inward for a certain distance, extends upward and inward toward the rotating member to which it is not attached, and terminates short of the rotating member to which it is not attached;
    wherein the interlocking arms are positioned one on top of the other such that they form a closed shape when the interlocking arms are in a closed position;
    wherein the rotating members rotate about the shaft, thereby causing the interlocking arms to rotate relative to one another: and
    wherein each interlocking arm is free to rotate three hundred sixty decrees (360°) about the shaft.

2. A device for allowing jewelry strands to be added or replaced comprising:
    (a) two interlocking arms;
    (b) two rotating members;
    (c) a barrel piece with two ends:
    (d) a shaft extending from each end of the barrel piece and comprising two ends: and
    (e) two knobs that are soldered to each end of the shaft;
    wherein each interlocking arm comprises a closed end and an open end;
    wherein the closed end of each interlocking arm is attached to one of the rotating, members;
    wherein each shaft extends through a respective aperture of each rotating members;

wherein the rotating members are in between the knobs, to prevent the rotating, members from falling off the shaft;

wherein each interlocking arm is of a certain size, and the two interlocking arms are roughly the same size;

wherein the open end of each interlocking arm is enlarged relative to a thickness of a middle portion of the interlocking arm between the closed end and the open end;

wherein each interlocking arm extends inward and downward from the rotating member to which it is attached until it has extended beyond the rotating member to which it is not attached, curves inward for a certain distance, extends upward and inward toward the rotating member to which it is attached, and terminates short of the rotating member to which it is attached;

wherein the interlocking arms are positioned one on top of the other such that they form a closed shape when the interlocking arms are in a closed position; and wherein the rotating members rotate about the shaft, thereby causing the interlocking arms to rotate relative to one another.

3. The device of claim 2, wherein each of the two interlocking arms is free to rotate at least 180 degrees.

4. The device of claim 1 or 2, wherein the barrel piece and shaft are a single piece.

5. The device of claim 1 or 2, wherein the barrel piece is attached to one part of a jewelry clasp or to a ring that is attached to a link in a jewelry chain.

6. The device of claim 1 or 2, wherein the closed shaped formed by the interlocking arms when they are in a closed position is selected from the group consisting of: a circle, an oval, a square, a rectangle, a triangle, a hexagon, an octagon, and a diamond.

7. The device of claim 1, further comprising an arc-shaped member with two ends, wherein each end of the arc-shaped member is attached to one of the knobs on either end of the shaft, and wherein the arc-shaped member either forms one part of a jewelry clasp or is attached to a link in a jewelry chain.

8. The device of claim 1 or 2, wherein at least one jewelry strand is placed on the interlocking arms when they are in a closed position;

wherein each jewelry strands comprises two ends and a ring on each end of the strand; and wherein the ring on each end of the strand is placed around both of the interlocking arms when they are in a closed position by inserting the ring over the open end of one of the interlocking arms, sliding the ring across the interlocking arm toward the closed end of the interlocking arm, and inserting the ring over the open end of the other interlocking arm.

9. A device for allowing jewelry strands to be added or replaced comprising:
(a) two interlocking arms;
(b) two rotating members;
(c) a barrel piece with two ends;
(d) a shaft with two ends extending from each end of the barrel piece; and
(e) two knobs that are formed by hammering the ends of the shaft to form a rivet on either end of the shaft;

wherein each interlocking arm comprises a closed end and an open end;

wherein the closed end of each interlocking arm is attached to one of the rotating members;

wherein each shaft extends through a respective aperture of the rotating members;

wherein the rotating members are in between the knobs, to prevent the rotating members from falling off the shaft;

wherein each interlocking arm is of a certain size, and the two interlocking, arms are roughly the same size;

wherein the open end of each interlocking arm is enlarged relative to a thickness of a middle portion of the interlocking arm between the closed end and the open end;

wherein each interlocking arm extends downward and outward from the rotating, member to which it is attached, curves inward for a certain distance, extends upward and inward toward the rotating member to which it is not attached, and terminates short of the rotating member to which it is not attached;

wherein the interlocking arms are positioned one on top of the other such that they form a closed shape when the interlocking arms are in a closed position;

wherein the rotating members rotate about the shaft, thereby causing the interlocking arms to rotate relative to one another; and wherein each interlocking arm is free to rotate three hundred sixty degrees (360°) about the shaft.

10. A device for allowing jewelry strands to be added or replaced comprising:
(a) two interlocking arms;
(b) two rotating members;
(c) a barrel piece with two ends;
(d) a shaft extending from each end of the barrel piece; and
(e) two knobs that are formed by hammering the ends of the shaft to form a rivet on either end of the shaft;

wherein each interlocking arm comprises a closed end and an open end;

wherein the closed end of each interlocking arm is attached to one of the rotating members;

wherein each shaft extends through a respective aperture of each rotating members;

wherein the rotating members are in between the knobs, to prevent the rotating members from falling off the shaft;

wherein each interlocking arm is of a certain size, and the two interlocking arms are roughly the same size;

wherein the open end of each interlocking arm is enlarged relative to a thickness of a middle portion of the interlocking arm between the closed end and the open end;

wherein each interlocking arm extends inward and downward from the rotating member to which it is attached until it has extended beyond the rotating member to which it is not attached, curves inward for a certain distance, extends upward and inward toward the rotating member to which it is attached, and terminates short of the rotating member to which it is attached;

wherein the interlocking arms are positioned one on top of the other such that they form a closed shape when the interlocking arms are in a closed position; and wherein the rotating members rotate about the shaft, thereby causing the interlocking arms to rotate relative to one another.

* * * * *

UNITED STATES PATENT AND TRADEMARK OFFICE
CERTIFICATE OF CORRECTION

PATENT NO. : 8,205,471 B2  
APPLICATION NO. : 12/563970  
DATED : June 26, 2012  
INVENTOR(S) : Nancy R. McLees Page 1 of 1

It is certified that error appears in the above-identified patent and that said Letters Patent is hereby corrected as shown below:

On the Title Page:

Under Item (74) Attorney, Agent, or Firm, the attorney's name appears as:

Antionette M. Tease

Should be:

Antoinette M. Tease

Signed and Sealed this
Seventh Day of August, 2012

David J. Kappos
*Director of the United States Patent and Trademark Office*